United States Patent
Yamazaki

(10) Patent No.: US 7,350,944 B2
(45) Date of Patent: Apr. 1, 2008

(54) AUTOMATIC LEVELING APPARATUS AND METHOD OF HEADLAMP FOR VEHICLE

(75) Inventor: Atsushi Yamazaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 29 days.

(21) Appl. No.: 11/048,672

(22) Filed: Feb. 1, 2005

(65) Prior Publication Data

US 2005/0174785 A1  Aug. 11, 2005

(30) Foreign Application Priority Data

Feb. 6, 2004  (JP) .................. P. 2004-030076

(51) Int. Cl.
- G01B 5/00 (2006.01)
- B60Q 1/00 (2006.01)
- F21V 19/02 (2006.01)
- F21V 23/04 (2006.01)

(52) U.S. Cl. .............. 362/460; 362/532; 362/466; 362/276; 362/802

(58) Field of Classification Search ........... 362/532, 362/460–466, 273, 802
See application file for complete search history.

(56) References Cited

U.S. PATENT DOCUMENTS

| | | | |
|---|---|---|---|
| 6,109,759 A * | 8/2000 | Tanabe et al. ............ | 362/42 |
| 6,305,823 B1 * | 10/2001 | Toda et al. ............... | 362/276 |
| 6,688,761 B2 * | 2/2004 | Kondo et al. ............. | 362/466 |
| 6,729,749 B2 * | 5/2004 | Kondo et al. ............. | 362/466 |
| 7,054,730 B2 * | 5/2006 | Izawa et al. .............. | 701/49 |

FOREIGN PATENT DOCUMENTS

JP  2001-328484  11/2001

* cited by examiner

Primary Examiner—Jong-Suk (James) Lee
Assistant Examiner—David J Makiya
(74) Attorney, Agent, or Firm—Fish & Richardson P.C.

(57) ABSTRACT

In an automatic leveling apparatus, a motor inclines an optical axis of a headlamp in an up and down direction relative to a vehicle body, a vehicle height sensor detects a change in a height direction of an axle portion of a front wheel or a rear wheel of a vehicle, and an involatile memory records a control constant inherent to the vehicle. CPU determines whether the control constant is recorded to the involatile memory, calculates a pitch angle based on the control constant inherent to the vehicle and a detecting output of the vehicle height sensor, and controls to drive the motor by generating a control signal for canceling the pitch angle. CPU calculates the pitch angle on a condition that the control constant is recorded to the involatile memory, outputs the control signal and stops to output the control signal to the motor otherwise.

4 Claims, 2 Drawing Sheets

AUTOMATIC LEVELING APPARATUS AND METHOD OF HEADLAMP FOR VEHICLE

This application claims foreign priority based on Japanese patent application JP 2004-030076, filed on Feb. 6, 2004, the contents of which is incorporated herein by reference in its entirety.

BACKGROUND OF THE INVENTION

1. Field of the Invention

The present invention relates to an automatic leveling apparatus and method of a headlamp of a vehicle for automatically controlling to incline an optical axis of a headlamp, based on an inclination in a front and rear direction of a vehicle (hereinafter, referred to as pitch angle), in a direction of canceling an amount in correspondence with the pitch angle (hereinafter, referred to as auto leveling). Particularly, the present invention relates to an automatic leveling apparatus for controlling to incline an optical axis of a headlamp in an up and down direction by calculating the pitch angle based on a control constant inherent to the vehicle.

2. Description of the Related Art

In a headlamp used in an automatic leveling apparatus, for example, a reflector inserted with a light source is supported by a lamp body inclinably around a horizontal inclination axis and an optical axis of the reflector (headlamp) can be inclined around the horizontal inclination axis by an actuator.

Further, an automatic leveling apparatus of a related art comprises a vehicle height sensor for detecting a change in a height of an axle portion of a front wheel or a rear wheel of a vehicle, a vehicle speed sensor for detecting a speed of the vehicle, a controller for controlling to drive an actuator based on respective detecting signals of the vehicle height sensor and the vehicle speed sensor at the vehicle. The automatic leveling apparatus of the related art controls an optical axis of a headlamp (reflector) to be brought into a state of being always constant relative to a road face.

That is, when a direction of the optical axis of the headlamp is directed upward by an inclination of a vehicle body, glare is cast to a vehicle running on an opposite lane, or when the direction of the optical axis of the headlamp is directed downward, remote recognizability of a driver is deteriorated. Therefore, the direction of the optical axis of the headlamp is controlled to be always constant.

Meanwhile, in controlling to drive the actuator based on the pitch angle, it is necessary to calculate the pitch angle in consideration of the specification of the vehicle. That is, depending on a kind of the vehicle, the vehicle comprises one vehicle height sensor or two vehicle height sensors, further, depending on the kind of the vehicle, a length of a wheel base differs. Therefore, a control constant coinciding with the specification of the vehicle is set in correspondence with the kind of the vehicle, the set control constant is written to a memory of ECU (Electronic Control Unit) and ECU is made to be common regardless of the kind of the vehicle (refer to JP-A-2001-328484 (refer to page 2 through page 4, FIG. 1, FIG. 5)).

ECU of the related art is made to be common regardless of the specification of the vehicle by writing the control constant inherent to the vehicle to the memory of ECU after integrating the headlamp to the vehicle. However, in controlling to drive the actuator, it is not determined whether the control constant is written to the memory. Therefore, when the control constant of the memory is erroneously written, or a wrong control constant is written to the memory, accurate auto leveling cannot be carried out.

SUMMARY OF THE INVENTION

It is an object of the present invention to provide an automatic leveling apparatus and method which determines whether a control constant inherent to a vehicle is recorded and controls to drive an actuator in accordance with a result of the determination, thereby improving the reliability of the apparatus.

In order to achieve the above-described object, an automatic leveling apparatus of a headlamp for a vehicle, according to the present invention, for detecting a change in an attitude of a vehicle and adjusting an optical axis of the headlamp to cancel the change in the attitude of the vehicle, comprises:

an actuator for inclining the optical axis of the headlamp in an up and down direction relative to a vehicle body;

a vehicle height detector for detecting a change in a height direction of an axle portion of at least one of a front wheel and a rear wheel of the vehicle;

a control constant recording section for recording a control constant inherent to the vehicle;

a control constant determining section for determining whether the control constant is recorded to the control constant recording section; and a controller for calculating an amount of a change from a reference attitude of the vehicle based on the control constant inherent to the vehicle and a detecting output of the vehicle height detector, and controlling to drive the actuator to cancel the calculated change amount, wherein the controller controls the actuator by calculating the change amount on a condition that the control constant determining section determines the control constant is recorded to the control constant recording section, and stops to control the actuator on a condition that the control constant determining section determines the control constant is not recorded to the control constant recording section.

That is, after integrating the headlamp to the vehicle, it is determined whether the control constant inherent to the vehicle is recorded to the control constant recording section. The calculation of calculating the amount of the change from the reference attitude of the vehicle (pitch angle) is executed on the condition that the control constant is recorded to the control constant recording section, the actuator is controlled to drive in accordance with the result of the calculation and is stopped to control the actuator otherwise. Therefore, the automatic leveling based on an erroneous control constant is not executed and the problem of bringing about glare to a vehicle running on an opposite lane, deteriorating the recognizability of the front side of the vehicle or the like can be avoided from being brought about.

As is apparent from the above-described explanation, according to the automatic leveling apparatus of a headlamp for a vehicle, the apparatus can contribute to safe running of the vehicle by executing highly reliable automatic leveling based on the proper control constant.

Further, the automatic leveling apparatus of a headlamp for a vehicle, may further comprises:

an indicator lighting or winking in response to an instruction from the controller, wherein the controller instructs to light or wink the indicator on a condition that the control constant determining section determines the control constant is not recorded to the control constant recording section.

That is, when the control constant inherent to the vehicle is not recorded to the control constant recording section, an accurate pitch angle cannot be calculated. Therefore, it can be informed that an abnormality is brought about by lighting or winking the indicator.

As is apparent from the above-described explanation, according to the automatic leveling apparatus of a headlamp for a vehicle, when the automatic leveling based on the proper control constant cannot be executed, the abnormality of the automatic leveling apparatus can simply be recognized by lighting or winking the indicator. Therefore, the apparatus can contribute to safe running of the vehicle.

DETAILED DESCRIPTION OF THE INVENTION

Hereinafter, an exemplary, non-limiting embodiment of the invention will be explained with reference to the accompanying drawings. In the present invention, terms are presumed to have their ordinary meaning as would be understood by one of ordinary skill in the relevant art. However, terms may also be operationally defined in this disclosure to have a specific meaning. Further, it should be noted that the following embodiment do not restrict the invention described in claim.

Figure 1:
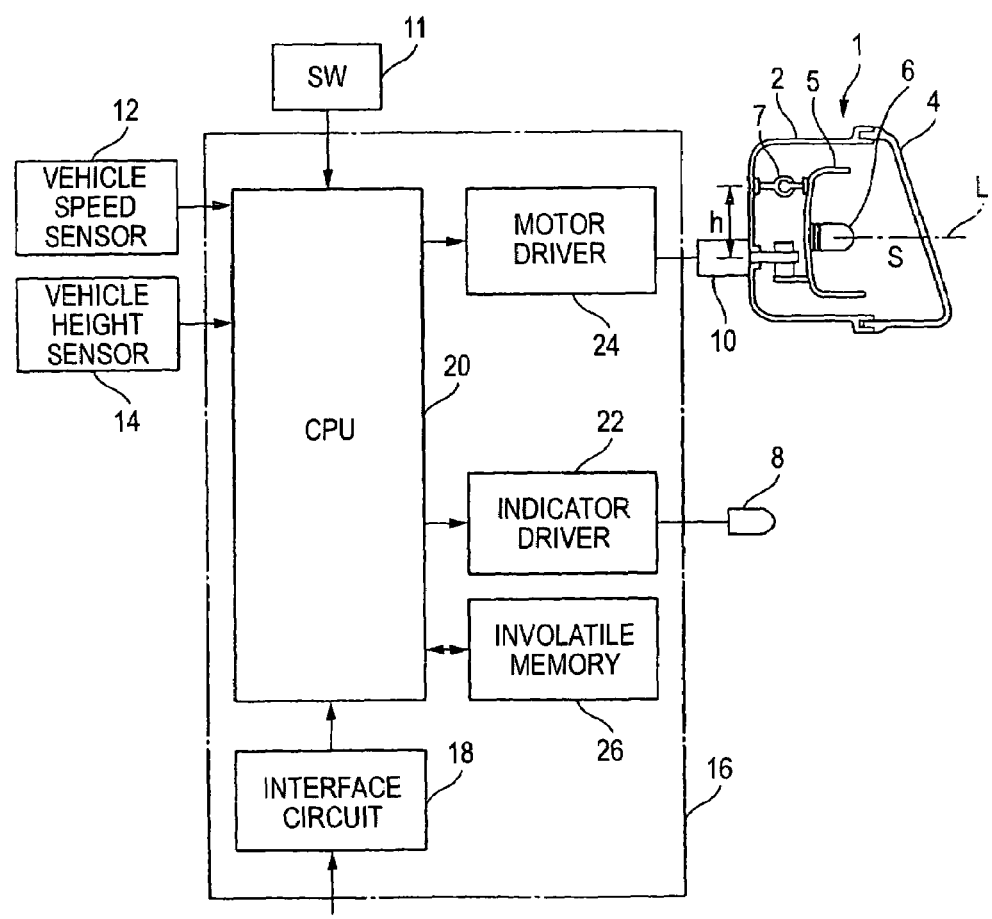
FIG. 1 is a total constitution diagram of an automatic leveling apparatus of a headlamp for a vehicle according to an embodiment of the invention.
Figure 2:
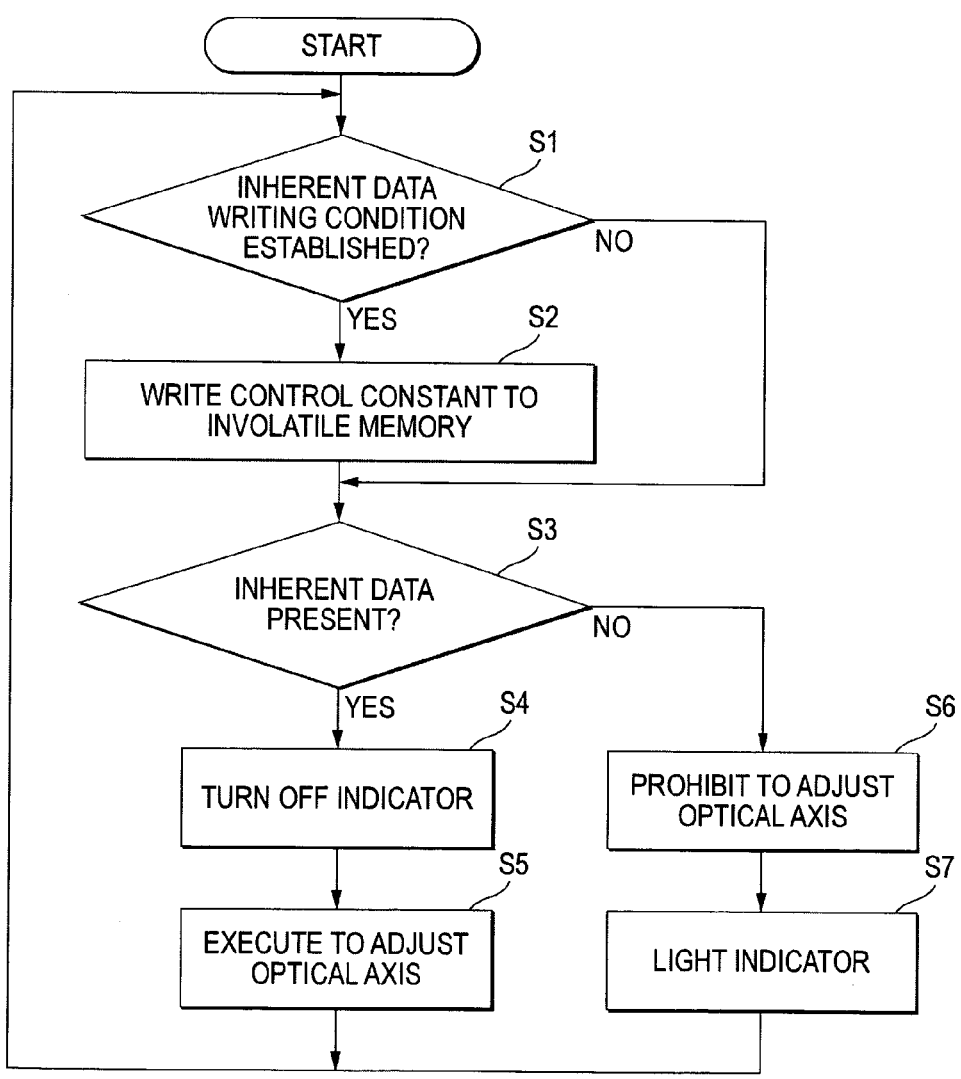
FIG. 2 is a flowchart for explaining operation of CPU as a controller of the apparatus.

FIG. 1 and FIG. 2 show an embodiment of the invention, FIG. 1 is a total constitution diagram of an automatic leveling apparatus of a headlamp for a vehicle according the embodiment of the invention, and FIG. 2 is a flowchart for explaining operation of CPU which is a controller of the apparatus.

In FIG. 1, the headlamp 1 for a vehicle comprises a lamp body 2 in a vessel-like shape. An opening portion of a front face of the lamp body 2 is integrated with a front lens 4 to partition a lamp chamber S. At inside of the lamp chamber S, a reflector 5 in a shape of a parabolic face inserted with a bulb 6 as a light source is supported to incline around a horizontal inclination axis (axis orthogonal to paper face of FIG. 1) 7 and can be controlled to incline by a motor 10 as an actuator.

Further, the automatic leveling apparatus of the headlamp 1 comprises the motor 10 as the actuator, a vehicle speed sensor 12 as a vehicle speed detector, a vehicle height sensor 14 as a vehicle height detector, an ECU unit 16, and an indicator (indicator bulb) 8. The motor 10 controls to incline an optical axis L of the headlamp 1 relative to the vehicle body in an up and down direction by receiving a signal of driving the actuator. The vehicle speed sensor 12 detects a speed of the vehicle. The vehicle height sensor 14 detects a change in a height direction of an axle portion of a front wheel or/and a rear wheel of the vehicle (a change amount x of a suspension). The ECU unit 16 controls to drive the motor 10. The indicator 8 is arranged at inside of a meter for lighting or winking in response to an instruction in abnormality.

The ECU unit 16 includes an interface circuit 18, CPU (Center Processing Unit) 20, an indicator driver 22 for driving to light or wink the indicator 8, a motor driver 24 for driving the motor 10, and an involatile memory 26 as a control constant recording section for recording a control constant inherent to the vehicle.

CPU 20 serves as a control constant transmitting section for recording the control constant to the involatile memory 26 when the control constant inherent to the vehicle is inputted from an input device of a keyboard or the like or outside communicating means. CPU 20 also serves as a control constant determining section for determining whether the control constant inherent to the vehicle is recorded to the involatile memory 26 by making access to the involatile memory 26, for example, for each control period.

Further, CPU 20 determines running/stationary state of the vehicle based on a signal from the vehicle speed sensor 12, and calculates the pitch angle of the vehicle based on a signal from the vehicle height sensor 14 and the control constant recorded to the involatile memory 26. Then CPU 20 outputs a control signal for driving the motor 10 based on data of the pitch angle provided by the calculation. The motor driver 24 generates an actuator drive signal by amplifying the control signal from CPU 20 and outputs an actuator drive signal to the motor 10. That is, the motor driver 24 constitutes an element of the actuator along with the motor 10 by outputting the actuator drive signal to the motor 10 by amplifying the control signal from CPU 20. CPU 20 determines whether the control constant inherent to the vehicle is recorded to the involatile memory 26. On a condition that the control constant inherent to the vehicle is recorded to the involatile memory 26, CPU 20 calculates an amount of a change from a reference attitude of the vehicle as an inclination (pitch angle) in a front and rear direction of the vehicle based on the control constant inherent to the vehicle recorded to the involatile memory 26 and a detecting output (detecting signal) of the vehicle height sensor 14. Then CPU 20 generates the control signal for canceling the change amount from a result of the calculation and outputs the generated control signal to the motor driver 24. On the other hand, when CPU 20 determines the control constant inherent to the vehicle is not recorded to the involatile memory 26, CPU 20 serves as a controller for stopping to output the control signal to the motor driver 24.

Further, when the data of the control constant inherent to the vehicle is not recorded to the involatile memory 26, in order to inform a user that an abnormal state is brought about, CPU 20 serves the controller for lighting or winking the indicator 8 via the indicator driver 22. Further, when the data written to the involatile memory 26 is an initial value of delivery test data or the like, CPU 20 stops to output the control signal to the motor driver 24 by determining that accurate data of the control constant is not recorded to the involatile memory 26, and lights or winks the indicator 8 via the indicator driver 22.

Here, in recording data with regard to the control constant inherent to the vehicle to the involatile memory 26, since there is adopted a one sensor system providing the vehicle height sensor 14 only at a suspension on a side of a rear wheel in the vehicle according to the embodiment, a coefficient C and a segment D in Equation (1), shown below, are recorded as the control constants inherent to the vehicle and a coefficient E and a segment F in Equation (2) are recorded as the control constants inherent to the vehicle.

$$dHr = Cx + D \qquad (1)$$

$$\text{pitch angle } P = E \times dHr + F \qquad (2)$$

Notation dHr in Equation (1) designates an amount of a change in a detecting value when the vehicle height sensor 14 is used as a rear vehicle height sensor, and notation x designates a detecting value of the rear vehicle height sensor which is an amount of displacing the suspension. Further, the coefficient C indicates an inclination of a straight line when the change amount dHr is set to the ordinate and the displacement amount x of the suspension is set to the abscissa, and notation D designates a value of the segment on the ordinate. Notation E in equation (2) designates an inclination of a straight line when the pitch angle is set to the ordinate and the change amount dHr of the vehicle height sensor 14 is set to the abscissa, and notation F designates a value of a segment on the ordinate.

Further, when the vehicle height sensor 14 adopts a two sensors system in which the vehicle height sensors 14 are provided respectively at the suspension on the side of the rear wheel and a suspension on a side of a front wheel, a coefficient A and a segment B in Equation (3), shown below, are recorded to the involatile memory 26 as the control constants inherent to the vehicle, and a coefficient C and a segment D in Equation (4) and a wheel base W in Equation (5) are respectively recorded to the involatile memory 26 as the control constants inherent to the vehicle.

$$dHf = Ax + B \quad (3)$$

$$dHr = Cx + D \quad (4)$$

$$\text{pitch angle} = \arctan[(dHf - dHr)/W] \quad (5)$$

Notation dHf in Equation (3) designates an amount of changing a detecting value of the vehicle height sensor 14 on a front side, the coefficient A designates an inclination of a straight line when a change amount dHf is set to the ordinate and an amount x of displacing the suspension which is a detecting value of the front side vehicle height sensor 14 is set to the abscissa and the segment B indicates a value of the segment on the ordinate. Further, Equation (4) is similar to the equation (1).

Further, the pitch angle P in Equation (5) is provided by dividing a difference between the change amount dHf of the detecting value of the front side vehicle height sensor 14 and the change amount dHr of the detecting value of the rear side vehicle height sensor 14 by the wheel base W to calculate an arctangent value thereof.

Further, even when either of the one sensor system or the two sensor system is adopted, as a control constant common to all the system, also a control constant with regard to a length of an arm up to an inclination center of the inclinable reflector 5 (a distance between a fulcrum of moving the reflector 5 in a front and rear direction and the horizontal inclination axis 7) h is recorded to the involatile memory 26.

Instead of recording the control constants to the involatile memory 26, the control constants can also be written to EEPROM (Electrical Erasable and Programmable Read Only Memory) of the ECU unit 16 and can also be written to a portion of a memory of a flash microcomputer constituted by a flash memory.

Next, a control for driving the motor 10 by CPU 20 will be explained in accordance with a flowchart shown in FIG. 2.

First, the routine is started to operate in a state of lighting the headlamp 1 by making a headlamp lighting switch 11 ON. That is, a control is started on a condition that the headlamp 1 is brought into a lighting state after integrating the headlamp 1 to the vehicle. CPU 20 determines whether a condition for writing the inherent data as data with regard to the control constants inherent to the vehicle is established (step S1). For example, it is determined whether the vehicle is brought into a stationary state based on the detecting signal of the vehicle speed sensor 12 and also determines whether a writing command is inputted, and when the writing condition is established, the control constants inputted via the interface circuit 18 are written to the involatile memory 26 (step S2). Further, step S1 and step S2 may be constituted to operate even in a state in which the headlamp 1 is not lighted.

On the other hand, when the writing condition is not established, at an operating period (control period) for executing auto leveling different from a period of writing data, access is made to the involatile memory 26 and it is determined whether the inherent data (data with regard to the control constants inherent to the vehicle) is recorded to the involatile memory 26 (step S3). At the step S3, it is determined whether a flag indicating that the inherent data is recorded to the involatile memory 26 is erected, when the flag is erected, the indicator 8 is turned off by determining that the inherent data (data with regard to the control constants inherent to the vehicle) is recorded to the involatile memory 26 (step S4), an adjustment of the optical axis is executed (step S5). That is, the inclination (pitch angle) in the front and rear direction of the vehicle is calculated as an amount of a change from a basic attitude of the vehicle based on the inherent data (data with regard to the control constants inherent to the vehicle) and the detecting output of the vehicle height sensor 14. For example, in the case of the one sensor system, the calculation in accordance with Equations of (1) through (2) is executed. Further, a control signal for canceling the change amount is generated from a result of the calculation and the motor 10 is controlled to drive in accordance with the control signal. Thereby, the optical axis L of the headlamp 1 (reflector 5) is controlled to be an always constant state relative to the road face.

Meanwhile, when it is determined that the flag is not erected at step S3, adjustment of the optical axis is prohibited by determining that the inherent data (data with regard to the control constants inherent to the vehicle) is not recorded to the involatile memory 26 (step S6), the indicator 8 is lighted or winked (step S7) and processings of the routine are finished. In this case, it can be informed that an abnormal state is brought about by lighting or winking the indicator 8, and a failure in writing the control constants can be detected before delivery of the vehicle.

According to the embodiment, after integrating the headlamp 1 to the vehicle, it is determined whether the inherent data (data with regard to the control constants inherent to the vehicle) is recorded to the involatile memory 26. When the inherent data is recorded thereto, adjustment of the optical axis is executed. When the inherent data is not recorded thereto, adjustment of the optical axis is prohibited. Therefore, the reliability of the apparatus can be improved and a production efficiency of the vehicle can be improved.

Further, according to the embodiment, even when an inappropriate control constant is recorded to the involatile memory 26, adjustment of the optical axis is prohibited and therefore, glare can be prevented from being cast to other vehicle.

Further, by adopting means for transmitting data of the involatile memory 26 to RAM (memory) in CPU 20, access may be constituted to be made to the involatile memory 26 once initially after making a power source ON.

It will be apparent to those skilled in the art that various modifications and variations can be made to the described preferred embodiment of the present invention without departing from the spirit or scope of the invention. Thus, it is intended that the present invention cover all modifications and variations of this invention consistent with the scope of the appended claims and their equivalents.

What is claimed is:

1. An automatic leveling apparatus of a headlamp for a vehicle for detecting a change in an attitude of a vehicle and adjusting an optical axis of the headlamp to cancel the change in the attitude of the vehicle, said headlamp including an inclinable reflector and a light source, said automatic leveling apparatus comprising:

an actuator for inclining the optical axis of the headlamp in an up and down direction relative to a vehicle body;

a vehicle height detector for detecting a change in a height direction of an axle portion of at least one of a front wheel and a rear wheel of the vehicle;

a control constant recording section for recording a control constant inherent to the vehicle after integrating the headlamp to the vehicle;

a control constant determining section for determining whether or not the control constant inherent to the vehicle is correctly recorded to the control constant recording section, wherein the control constant inherent to the vehicle differs from an initial value previously recorded in the control constant recording section, and wherein the control constant inherent to the vehicle includes a length (h) of an arm up to an inclination center of the inclinable reflector, and the control constant determining section determines whether or not a length (h) that is different from the initial value is recorded; and a controller for calculating an amount of a change from a reference attitude of the vehicle based on the control constant inherent to the vehicle and a detecting output of the vehicle height detector, and controlling to drive the actuator to cancel the calculated change amount, wherein the controller controls the actuator by calculating the change amount on a condition that the control constant determining section determines the control constant inherent to the vehicle is recorded to the control constant recording section, and stops to control the actuator on a condition that the control constant determining section determines the control constant inherent to the vehicle is not recorded to the control constant recording section.

2. The automatic leveling apparatus of a headlamp for a vehicle according to claim 1, further comprising:

an indicator lighting or winking in response to an instruction from the controller, wherein the controller instructs to light or wink the indicator on a condition that the control constant determining section determines the control constant is not recorded to the control constant recording section.

3. An automatic leveling apparatus of a headlamp for a vehicle for detecting a change in an attitude of a vehicle and adjusting an optical axis of the headlamp to cancel the change in the attitude of the vehicle, said automatic leveling apparatus comprising:

an actuator for inclining the optical axis of the headlamp in an up and down direction relative to a vehicle body;

a vehicle height detector for detecting a displacement amount x of a suspension on a side of a front wheel or a rear wheel in the vehicle;

a control section for calculating a change amount dHr of the vehicle height from an equation $dHr=Cx+D$ based on the displacement amount x of the suspension and control constants inherent to the vehicle (C, D), and for calculating a pitch angle P which indicates the change in the attitude of the vehicle from an equation $P=E \cdot dHr+F$ based on the change amount dHr of the vehicle height and control constants inherent to the vehicle (E, F) and for controlling the actuator based on the pitch angle;

a control constant recording section for replacing the initial value of delivery test data with the control constants inherent to the vehicle (C, D, E, F) which are written after attaching the headlamp to the vehicle and for recording them;

a control constant determining section for determining whether the control constants inherent to the vehicle (C, D, E, F) are recorded to the control constant recording section; and a control stop section for stopping the control to the actuator when the control constants inherent to the vehicle (C, D, E, F) are not correctly recorded to the control constant recording section.

4. An automatic leveling apparatus of a headlamp for a vehicle for detecting a change in an attitude of a vehicle and adjusting an optical axis of the headlamp to cancel the change in the attitude of the vehicle, said automatic leveling apparatus comprising:

an actuator for inclining the optical axis of the headlamp in an up and down direction relative to a vehicle body;

a front-side vehicle height sensor and a rear-side vehicle height detector for detecting a displacement amount x of a suspension on a side of a front wheel or a rear wheel in the vehicle;

a control section for calculating a change amount dHf of the vehicle height on the front wheel side from an equation $dHf=Ax+B$ based on the displacement amount x of the front-wheel-side suspension and control constants inherent to the vehicle (A, B), for calculating a change amount dHr of the vehicle height on the rear wheel side from an equation $dHr=Cx+D$ based on the displacement amount x of the rear-wheel-side suspension and control constants inherent to the vehicle (C, D), and for calculating a pitch angle P which indicates the change in the attitude of the vehicle from an equation $P=\arctan[(dHf-dHr)/W]$ based on the change amounts dHf and dHr of the vehicle height and a wheel base W as a control constant inherent to the vehicle, and for controlling the actuator based on the pitch angle;

a control constant recording section for replacing the initial value of delivery test data with control constants inherent to the vehicle (A, B, C, D, W) which are written after attaching the headlamp to the vehicle and for recording them;

a control constant determining section for determining whether the control constants inherent to the vehicle (A, B, C, D, W) are recorded to the control constant recording section; and a control stop section for stopping the control for the actuator when the control constants inherent to the vehicle (A, B, C, D, W) are not correctly recorded to the control constant recording section.

* * * * *